United States Patent [19]

Mangarell

[11] 4,122,800
[45] Oct. 31, 1978

[54] SELF-CONTAINED VIVARIUM HABITAT
[76] Inventor: Edward M. Mangarell, 0 - 92 W. Amsterdam Ave., Fair Lawn, N.J. 07410
[21] Appl. No.: 813,032
[22] Filed: Jul. 5, 1977
[51] Int. Cl.$^2$ ............................................. A01K 64/00
[52] U.S. Cl. .......................................... 119/5; 119/15
[58] Field of Search ...................... 119/5, 1, 15; 47/69

[56] References Cited
U.S. PATENT DOCUMENTS

| 2,002,380 | 5/1935 | Wernicke | 47/69 |
| 2,126,056 | 8/1938 | Stearns | 119/1 |
| 2,300,776 | 11/1942 | Collins | 47/69 |
| 3,269,578 | 8/1966 | Lewis | 47/69 X |

Primary Examiner—Hugh R. Chamblee
Attorney, Agent, or Firm—James J. Cannon, Jr.; James J. Cannon

[57] ABSTRACT

This invention is concerned with a vivarium habitat for turtles, frogs, snakes, and newts, comprising a self-contained fully enclosed transparent upper vivarium housing which contains both a centrally oriented separate aquarium area, and a contiguous dry terrestrial region. The habitat's upper housing is enclosed on all four sides with transparent side panels, and on the top with both a transparent cover panel and a light apparatus, which is thermostatically controlled, and which provides both the necessary illumination and heat for the plants and animals enclosed within the habitat. The transparent side walls are vertically mounted onto the base frame structure upper member. The foundation surface of the upper transparent housing section of the habitat consists of a molded, contoured surface that contains a central water area of gradually increasing depth, with a contiguous barrier perimeter area, the remaining surrounding surface area being dry land for plant and animal use. The water is drained easily for cleaning purposes from the deepest part of the contoured aquatic surface, by removing a drain plug accessible from the undersurface of the upper habitat housing. Cleaning of the aquatic surface area after water drainage is simplified, it being unnecessary to remove the amphibians for this purpose.

1 Claim, 2 Drawing Figures

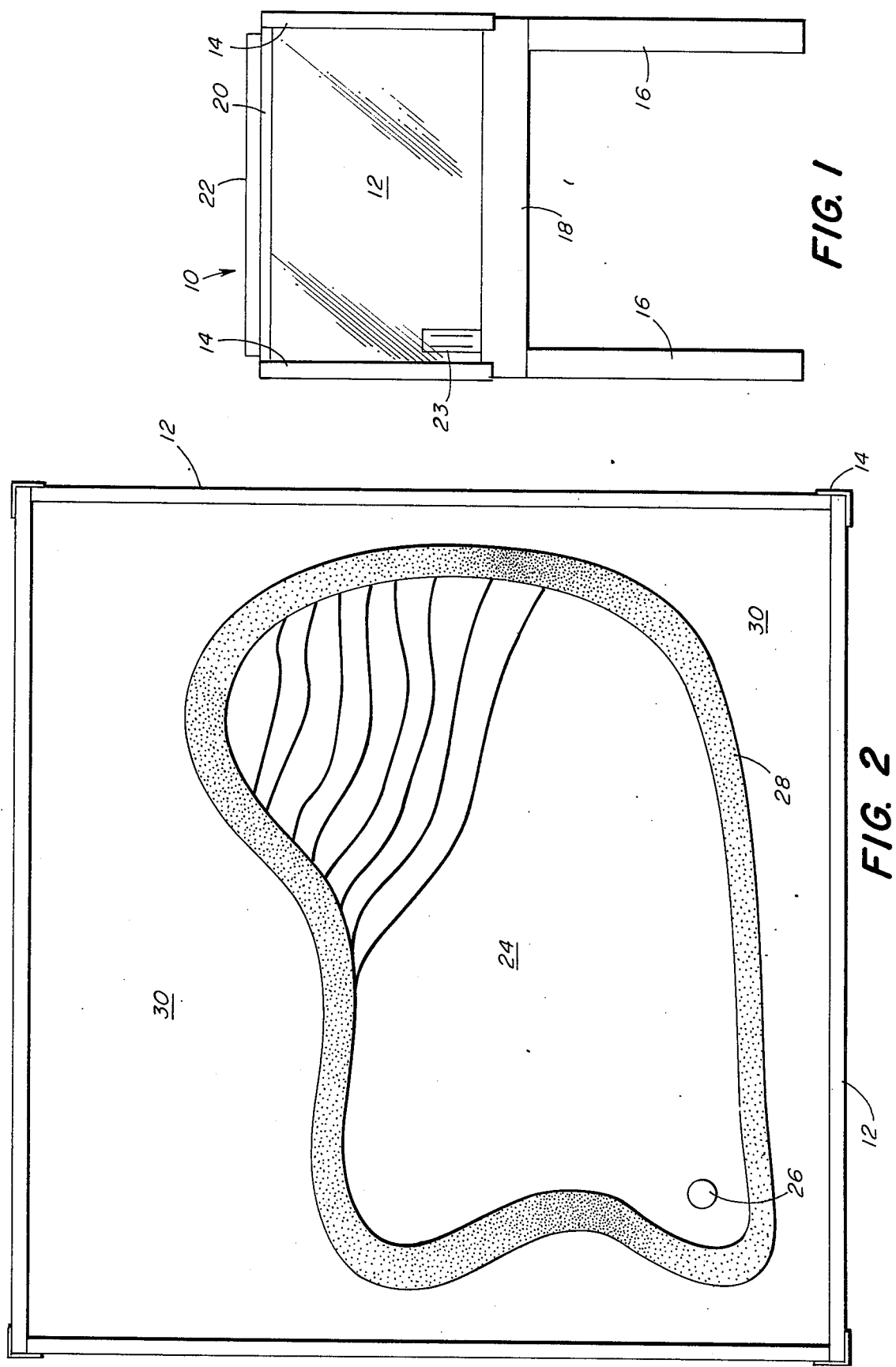

SELF-CONTAINED VIVARIUM HABITAT

BACKGROUND OF THE INVENTION

1. Field of the Invention

The present invention pertains to a self-contained balanced amphibian vivarium habitat having physically discrete but contiguous terrarium and aquarium areas. This carefully balanced ecological system allows the housed amphibians to survive in both a water and earth environment, with ready passage available from one to the other environment.

2. Description of the Prior Art

The literature is replete with fanciful devices to provide both a water and earth environment for small reptiles and amphibia, such as turtles, frogs, salamanders, newts, and the like. However, most of these devices require elaborate proceedures to provide the amphibian with a clean habitat. These often needed elaborate filter mechanisms, as well as the requirement to remove the animals from the habitat during the cleaning process. Further, raft-like devices were often provided to allow the amphibian a limited means to temporarily leave the aquatic environment. However, this did not allow the amphibian a means to obtain the needed exercise for certain muscles. Occasionally the "dry" areas were also too close to the light source, which created undesirable temperature regulation problems for the amphibian.

A further difficulty found in the prior art devices related particularly to the problem of environment cleaning, as touched upon above. Cleaning usually required draining of aquarium areas with a subsequent cleaning and then refilling of the tank with clean water. This did not always allow adequate cleaning procedures.

The present invention solves these problems quite satisfactorily, and provides a natural, balanced ecological setting for amphibians to live in with ease of access to both sufficient areas of land and water. The present invention also incorporates a simplified and rapid method of cleaning the aquatic portion of the habitat. The present embodiment is an inexpensive, highly functional and decorative device to both house and display amphibians and plants in a unique way.

SUMMARY OF THE INVENTION

The present invention pertains to a self-contained, balanced vivarium amphibian habitat, which represents a balanced ecological system, that allows amphibia to survive in both water and earth environments, with an easy passage available from one to the other environment. The present invention comprises an upper transparent habitat area which is enclosed on all four sides with transparent panels, with the top being partially covered with a transparent panel, and the remaining top area occupied by a light source, which provides both the required illumination and heat, and is thermostatically controlled for the plants and animals enclosed within the habitat. The transparent side walls are mounted onto a base frame structure. The lower portion of the upper habitat section consists of a molded, contoured surface that contains an aquatic area of increasing depth, with a surrounding barrier perimeter area, and with the remaining surrounding area of the habitat consisting of dry land for plants and animal use. The water in the present invention is drained quite easily and completely for cleaning purposes from the central contoured aquatic area, by removing a drain plub, which is reached from the undersurface of the habitat base portion. Cleaning of the water area surface after drainage is simplified, it being unnecessary to remove either the amphibia or plants for this purpose.

In the present invention both plants and animals will thrive in the humid environment, with the effect created of a miniature rain forest. This habitat provides a natural setting for amphibia to live in the requisits ease of access to both land and water being provided to the animals.

BRIEF DESCRIPTION OF THE DRAWINGS

FIG. 1 is a front view of the amphibian habitat of the present invention.

FIG. 2 is a top perspective view of the amphibian habitat of the present invention with the lighting apparatus removed.

DESCRIPTION OF THE PREFERRED EMBODIMENT

Referring now to the Figures, and in particular to FIG. 1, a front view of the amphibian habitat of the present invention, the upper amphibian habitat vivarium component of the present invention is identified as 10. The transparent rectangular side walls 12 are vertically mounted and attached through corner brackets 14, to the base frame structure 16 upper frame member 18. The top transparent cover panel 20, is situated horizontally resting on the transparent side walls 12, and coplanar to the base frame member 18, and displaced to the rear of the top transparent cover 20, and contiguous thereto to said top transparent cover, is the lighting apparatus 22.

FIG. 2 is a top perspective view of the amphibian habitat of the present invention, with the lighting apparatus 22 removed. The major aquatic area 24, which is a centrally located, irregularly-shaped and contoured depression, which gradually slopes to a water depth of three inches at the area above the removable drain plug 26. Peripherally surrounding the aquatic area 24, is a narrow barrier area 28, which is a perimeter area, that serves to separate the aquatic area 24 from the plants contained within the vivarium habitat. Contiguous to the outer terminus of the barrier 28, and occuppying the remaining surface space within the vivarium habitat, and extending to the transparent side walls 12, is the region known as the terrestrial region 30, which is used for plants. This terrestrial region 30 allows a region for exercise for the enclosed amphibia also.

Drainage of the water and wastes in the aquatic area 24 is readily accomplished by removing drain plug 26 from the undersurface of the amphibian habitat. Following subsequent cleaning of the aquatic area 24, the drain plug 26 is replaced and fresh water is then readily supplied through the top opening of the habitat with the top cover panel 20 removed. The animals and plants contained within the vivarium transparent habitat do not need to be removed therefrom during this regular cleaning and water change procedure.

The thermostat-thermometer means 23 is a conventional temperature device that carefully regulates the vivarium habitat temperature to a predetermined optimum range.

The aforementioned lighting apparatus 22, consists of a dual electrical light fixture containing both white florescent and dark-infrared elongated lamp tubes extending between the side transparent panels. Either one, or both of these tubes, may be on at any time. The white florescent lighting supplies the necessary 'daytime' radiant energy needed for proper plant growth and animal needs. The dark infrared lamp will provide the warmth needed during the day and night for the animals and plants of the enclosed habitat, which will be maintained thermostatically by the thermostatthermometer means 23 at the constant predetermined optimum range.

The preferred material of construction for the transparent top cover and transport side walls of the present device will be either glass or a clear plastic, such as polymethylacrylate or the like.

I claim:

1. A self-contained, ecologically-balanced, thermostatically-regulated amphibian vivarium habitat designed to allow the contained amphibia ready access between discrete water and earth environments, comprising:

- a base support structure having vertical legs and a horizontally oriented base frame member supported by said legs;
- an upper habitat housing having a substantially rectangular shape, having transparent vertically oriented, abutting side walls, the bases of said side walls being recessed in said base frame member;
- a plurality of right angle corner brackets connecting adjacent side walls;
- a rectangular, transparent top cover situated removably on top of said transparent side walls, coplanar with said base frame member, displaced forward of the rear side of said upper habitat structure;
- said base support structure and said upper habitat housing forming an integral portable, self-contained habitat which can be moved to any suitable location;
- a rectangular shaped lighting apparatus removably mounted along the rear side walls of said upper habitat housing and displaced to the rear of said top cover;
- said lighting apparatus having both a flourescent white light and an infrared dark light running parallel to said rear side wall;
- a thermometer-thermostat means mounted within the upper habitat housing to regulate and display the ambient temperature within said habitat to provide a balanced ecological environment;
- an integral molded, contoured foundation member for said upper habitat housing, mounting on said base support structure and within said transparent walls;
- said contoured foundation member having a centrally oriented, irregularly shaped, depressed aquatic region to serve as the water area of said habitat;
- said aquatic region being irregularly contoured and graduated in depth;
- a barrier area contiguous to and surrounding the perimeter of said aquatic region, serving to separate the aquatic region from the plants contained within said vivarium habitat;
- a terrestrial region contiguous to and surrounding said barrier area providing a raised area of level dry earth for planting extending to the transparent side walls of said upper habitat housing;
- said contiguous and discrete terrestrial, barrier and aquatic regions permitting amphibia ease of access to the regions of said vivarium habitat;
- a drain plug opening situated at the lowest point in said depressed aquatic region;
- a drain plug snugly fitted into said drain plug opening and accessible from beneath said base frame member for draining and cleaning purposes.

* * * * *